United States Patent [19]
Turnbull et al.

[11] 3,851,402
[45] Dec. 3, 1974

[54] VAPOR CHAMBER FOR DRYING

[75] Inventors: James O'Hara Turnbull; William Lipscomb Merritt, both of Cowansville, Quebec; Ivan Patrick McLaughlin, Sutton, Quebec, all of Canada

[73] Assignee: J. J. Barker Company Limited, Quebec, Canada

[22] Filed: Oct. 15, 1973

[21] Appl. No.: 406,626

[30] Foreign Application Priority Data
Nov. 29, 1972 Canada ................ 157802

[52] U.S. Cl. ............... 34/47, 34/155, 34/218, 34/242, 118/48
[51] Int. Cl. ............................... F26b 19/00
[58] Field of Search ......... 34/23, 47, 51, 242, 218, 34/219, 155; 118/48.49; 117/62.2

[56] References Cited
UNITED STATES PATENTS

| | | | |
|---|---|---|---|
| 2,853,970 | 9/1958 | Novak ............................. | 118/49 |
| 2,877,138 | 3/1959 | Vodonik ......................... | 118/49.1 X |
| 2,990,295 | 6/1961 | Breining et al. ................ | 118/48 X |
| 3,353,514 | 11/1967 | Lyle ............................... | 118/49 |
| 3,367,041 | 2/1968 | Troope et al. ................. | 34/155 X |
| 3,744,963 | 7/1973 | Flynn ............................. | 34/155 X |
| 3,793,741 | 2/1974 | Smith, Jr. ...................... | 34/155 X |
| 3,805,736 | 4/1974 | Foehring et al. .............. | 118/49 |

Primary Examiner—Morris Kaplan
Attorney, Agent, or Firm—Robert E. Mitchell; Alan Swabey

[57] ABSTRACT

A machine for fast curing wet coated objects including a conveyor for continuously passing the wet coated objects through a curing chamber, means of producing and conveying a vaporous quick curing or drying catalyst to the curing chamber and into contact with the wet coating of the material during the period of its passage through the curing chamber, means of providing and maintaining the required operating temperature of the catalyst vapor carrier mix in the curing chamber and means of providing and maintaining the required catalyst density or strength in the curing chamber, means for minimizing loss of catalyst from the curing chamber and means of avoiding atmospheric pollution.

5 Claims, 27 Drawing Figures

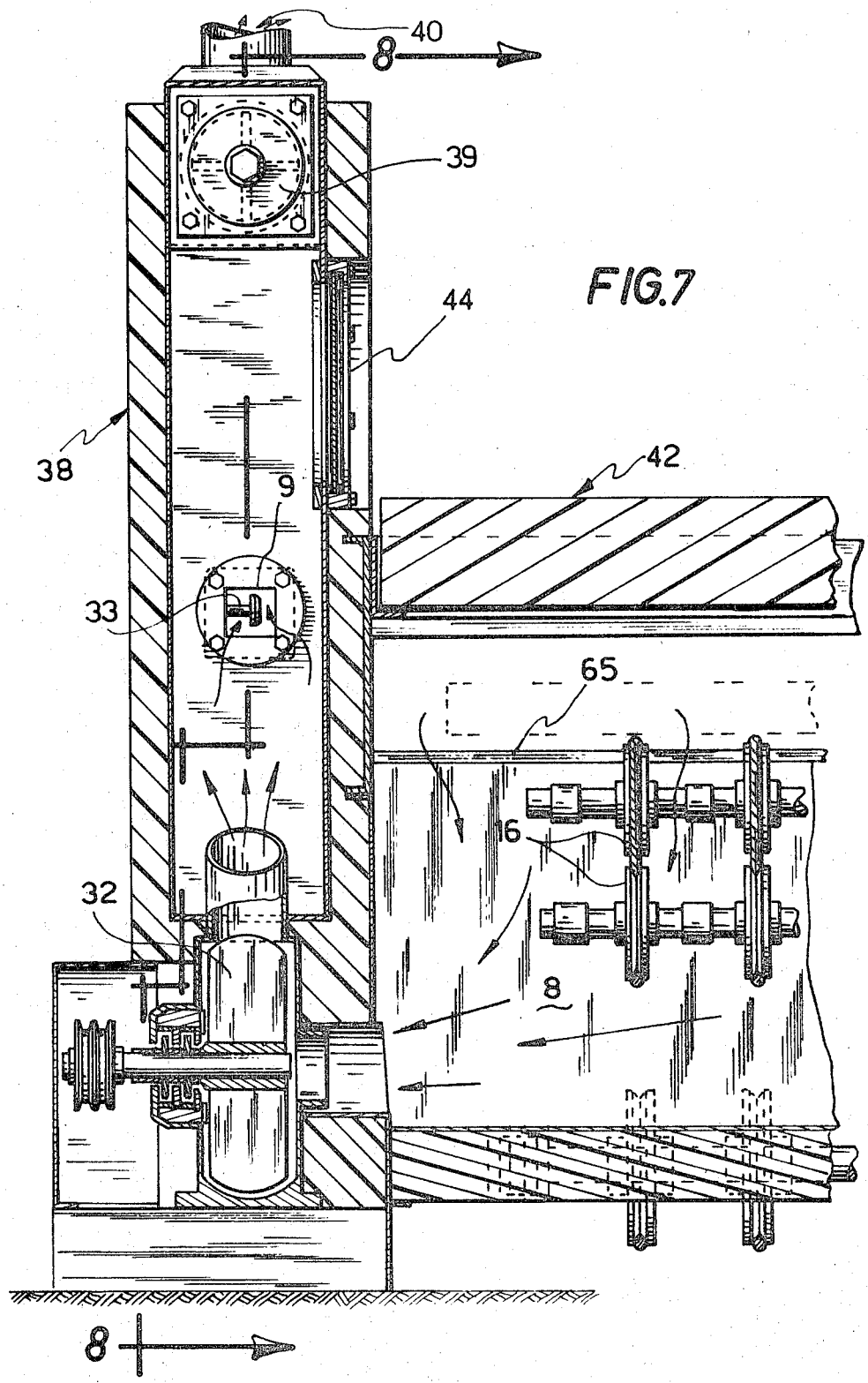

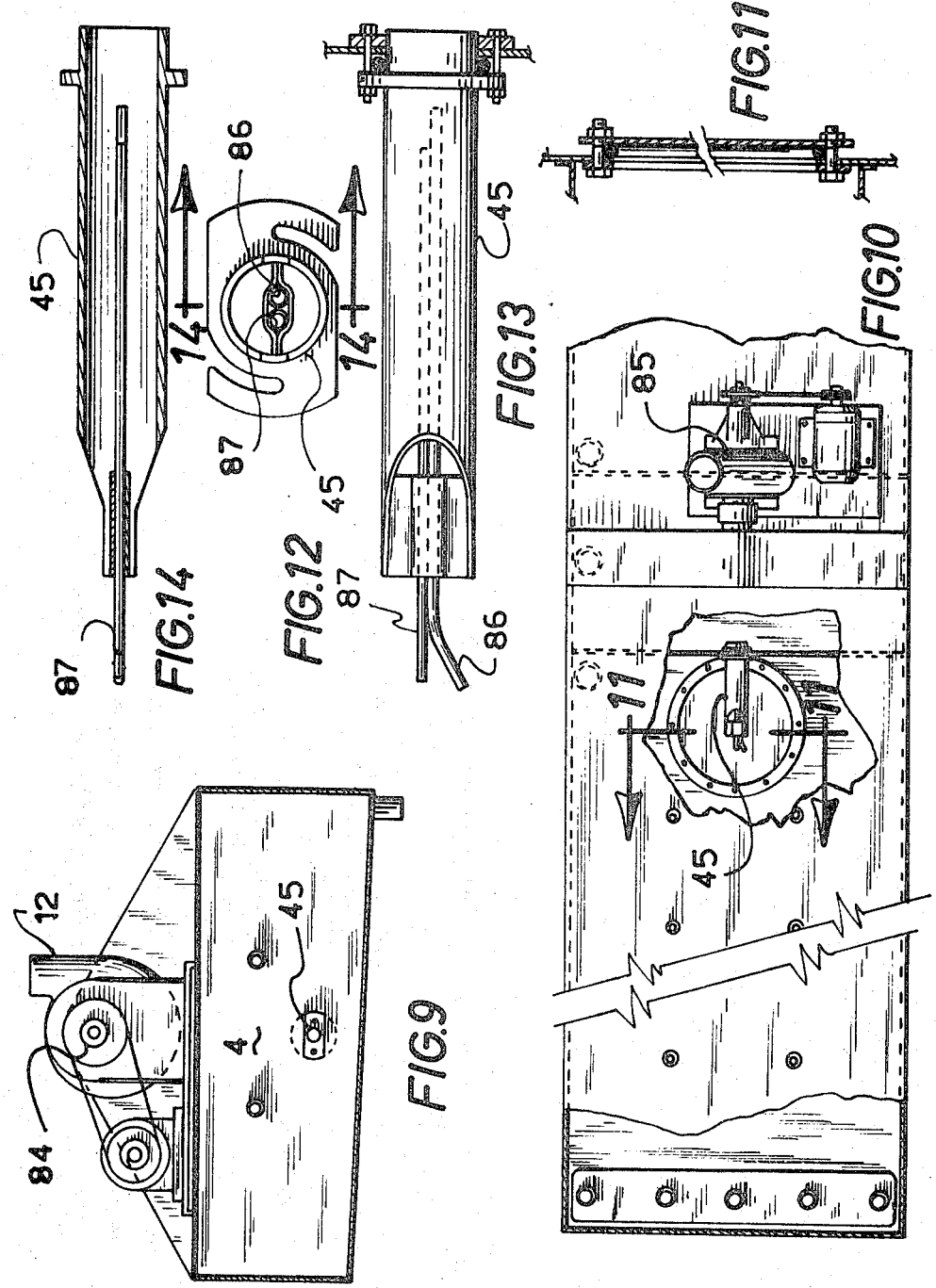

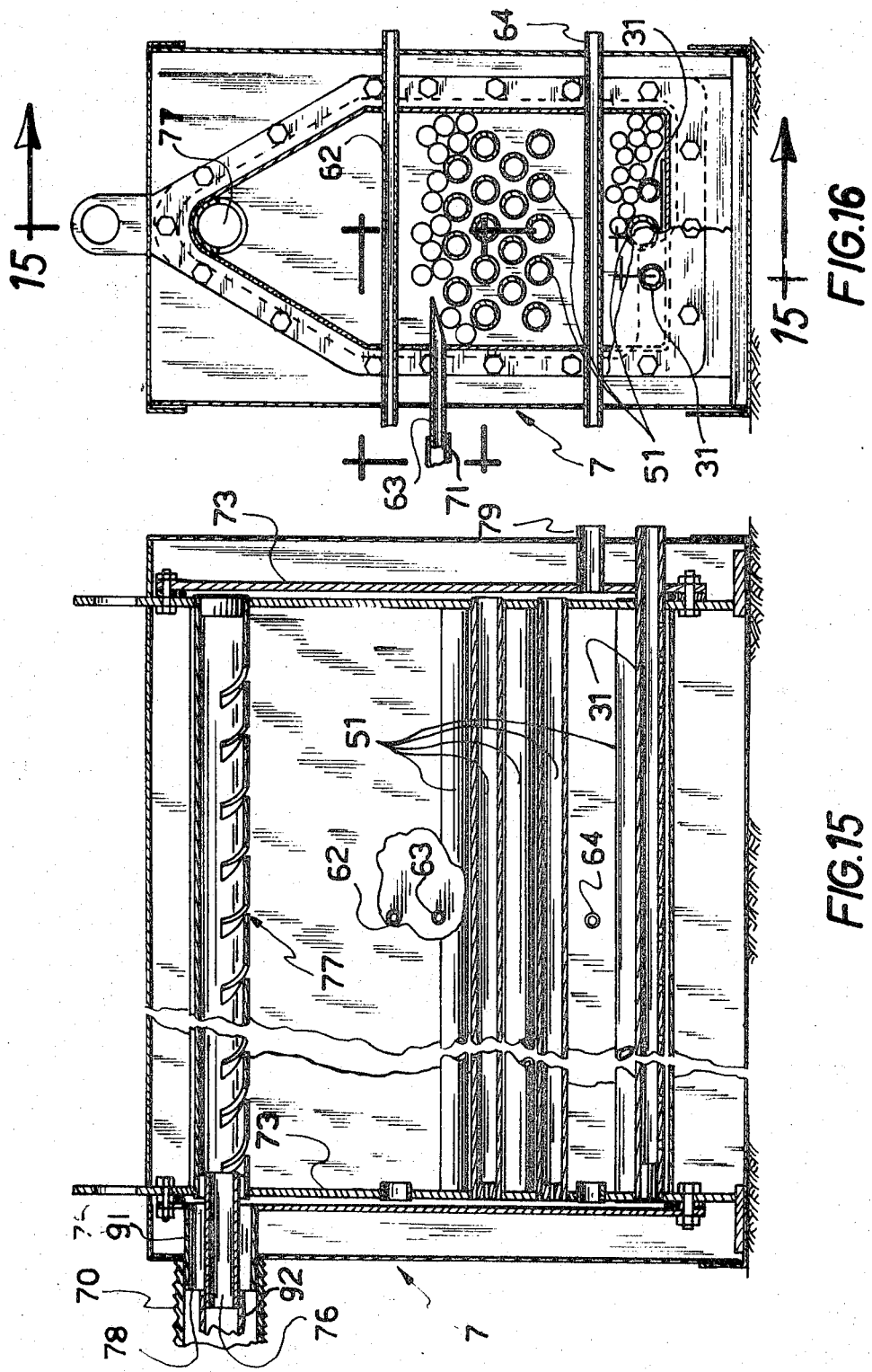

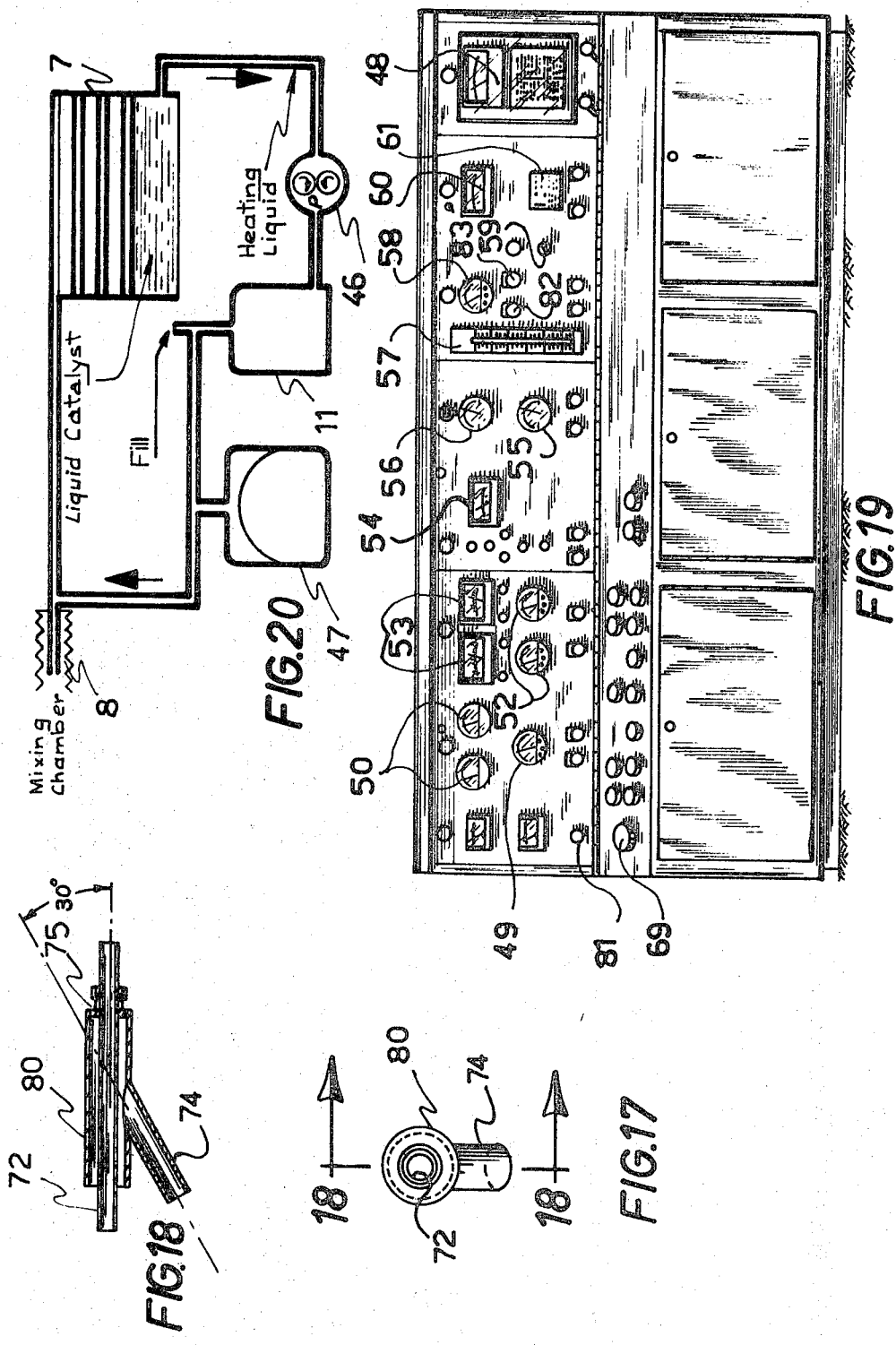

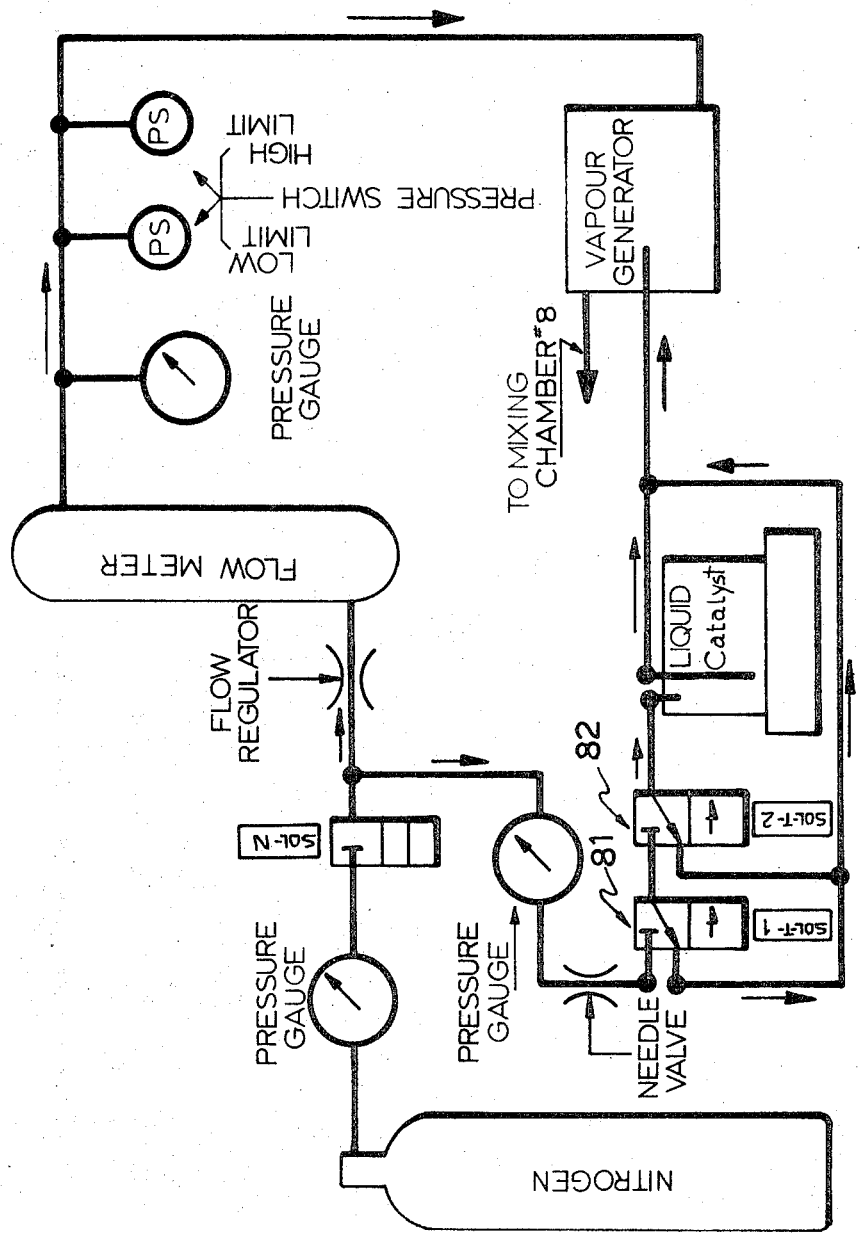

VAPOR CHAMBER FOR DRYING

BACKGROUND OF THE INVENTION

1. Field of the Invention

This invention relates to apparatus for handling and applying a volatile catalyst to wet surface finishes for the continuous rapid and cool curing thereof.

2. Description of the Prior Art

It is known to cure resin-coated surfaces, such as panels, by passing the wet coated panels through various heat treatments or by radiation or electron beam and ultraviolet ray systems. In the case of heat curing, those types of materials or substrates which react to heat would be affected, while in the case of the radiation type of treatment, the curing field would be restricted to the exact area of the direct path of a beam. Any of these systems involve serious personnel risks and very high costs.

There are certain catalysts, however, that are used as accelerators for drying paints and for curing resins. For instance, U.S. Pat. No. 3,411,940, issued Nov. 19, 1968, John A. Lopez et al, inventors, teaches a method of using a tertiary amine in a particular solution and bringing it in contact with the coating to be cured.

It would be preferable, in a continuous process, to be able to use such accelerators or catalysts, such as tertiary amines, in a vapor condition and to bring it in contact with the resin type wet finishes, whereby the resin would cure in seconds. However, due to the toxic nature of such accelerators, for example, tertiary amines, this method has not been found to be practical to date.

SUMMARY OF THE INVENTION

It is an aim of the present invention to provide a method and apparatus for continuously curing resin type wet coated articles by bringing the articles into contact with a vaporous accelerator, such as tertiary amine, in a safe, economic and practical manner.

An apparatus, in accordance with the present invention, includes means for continuously conveying the wet coated articles through a curing chamber, means for producing and passing a vaporous accelerator through the curing chamber in contact with the wet coating of the article during the period of its passage through the curing chamber, means for avoiding the escape of the vaporous accelerator to the atmosphere, and means for controlling the temperature and density of the vaporous accelerator within the curing chamber.

A method, in accordance with the present invention, includes the steps of passing wet resin-coated articles through an isolated curing station, selecting an accelerator acceptable for rapid curing of said wet resin coating, providing the accelerator in vaporous form into the isolated curing station into contact with the wet resin-coated article, maintaining the vaporous accelerator isolated from the atmosphere and controlling the density and temperature of the vaporous accelerator at the curing station.

In a specific embodiment, the wet coated substrates are carried by an endless conveyor through a chamber containing a vaporous catalyst which is continuously maintained at a sufficient density and temperature in the gaseous carrier to cure the wet coated surface in a period of time sufficiently short to permit the use of a curing chamber of a practical size and an adequate conveyor speed. The toxic nature of the catalyst requires not only its complete control in the area around the curing machine, but also the reduction to a permissible minimum of any loss or escape of the vapor into the atmosphere, and the economics of production require a compact and self-contained curing machine. The possible flammable or explosive nature of the vaporous catalyst requires an inert gas carrier and the exclusion from entry into the curing chamber of air or oxygen in a volume sufficient to produce a flammable or explosive gaseous mix, requirements which also necessitate reducing the size of the curing machine or apparatus as far as practical having regard to the sizes of the materials on which the wet coatings are to be cured. As the catalyst carrier, nitrogen is employed which, as an inert gas, is a very appropriate carrier and at the same time is freely available in necessary quantities at reasonable cost and satisfies the economics of the production of the cured finishes. The nitrogen, from standard pressure tanks, after being reduced to atmospheric pressure by an automatic pressure reduction valve, is passed through a flow control and then into liquid catalyst in a vapor generator which is maintained at a predetermined temperature, where it absorbs gaseous catalyst vapor. From the vapor generator, the vaporous catalyst nitrogen mix flows into a mixing chamber located below the curing chamber. Mixing fans located at each end of the mixing chamber direct the vaporous mix through manifolds into perforated impinger or diffuser tubes located in the curing chamber which direct the vapor at a suitable angle toward the surface to be cured and the center of the curing chamber and finally back to the mixing chamber. The direction of vapor flow from the impinger tubes can be adjusted to prevent rippling of the wet surface, to maintain turbulence in the vapor mix and to regulate the vapor flow pattern back to the mixing chamber from which it is recirculated. The catalyst density in the curing chamber is measured by a vapor analyzer connected to the curing chamber and additional catalyst automatically added as required by adjustment of nitrogen flow and temperature in the vapor generator. If an amine catalyst and a resin type wet coating are used, the effective operating density of the catalyst as a percentage of the carrier catalyst mix may be below ten percent by volume and due to the absorptive capacity of the carrier nitrogen, an operating temperature range between 80° and 90° F. will maintain the mix above the dew point and avoid condensation on the coating being cured.

The use of a closed circuit for the production of nitrogen catalyst mix eliminates the entry of any air borne oxygen up to the delivery of the vapor mix into the curing chamber. The entry of natural or air borne oxygen into the curing chamber through the entry and exit ports for the carrier and the material to be cured will dilute the strength of the catalyst mix and also tend to create a possible flammable or explosive mix in the curing chamber. Such entry is reduced at a point below which a flammable or explosive condition would be created in the curing chamber by means of a combined labyrinth and air curtain at each port and the introduction of warm moist air into the air curtains which increases their efficiency. This warm moist air moves against any outward flow from the curing chamber and being warmer than the atmosphere and the curing mix deflects up the exhaust duct of the air curtain and similarly deflects upward any escaping mix thus effectively excluding any leakage out the entry or exhaust portals. The warm moist air will also mix with and warm any air entering the portals and thus tend to carry and direct such external air up the exhaust stack.

The quantity of oxygen in the curing chamber and resultant dilution of the vaporous catalyst mix are indicated by the vapor analyzer referred to above. If an unacceptable amount of atmospheric oxygen builds up in the curing chamber, the latter can be purged via dump valves directly connected to the exhaust stack.

By connecting the exhaust stack to each air curtain through a common exhaust plenum and using balancing control gauge valves to maintain a pressure equilibrium between the two curtains and the introduction of moist air to increase the humidity in the curtains, the loss of catalyst is reduced to an acceptable minimum. By introducing a suitable vaporable chemical agent into the exhaust plenum, the vaporous catalyst can be neutralized and atmospheric pollution eliminated during curing operation.

The material to be cured is carried through the air curtains and the curing chamber on an appropriate conveyor which returns outside the curing chamber. The rate of travel of the conveyor is adjusted to correlate the time of exposure of the surface required and the length of the curing chamber.

The invention permits a continuous curing process which may be applied to any type of substrate and which is economical, safe and avoids air pollution.

BRIEF DESCRIPTION OF THE DRAWINGS

In the drawings which illustrate an embodiment of the invention:

FIG. 7 is a section on the line 7—7 of FIG. 1;

FIG. 9 is a section along the line 9—9 of FIG. 1;

FIG. 10 is a part top view and part bottom view of one end of the plenum;

FIG. 11 is a horizontal section of the bottom access panel along the line 11—11 of FIG. 10;

FIG. 12 is a front end view of one of the neutralizer drip and vacuum gauge intake units and holding plate;

FIG. 13 is a top view of the neutralizer drip and vacuum gauge intake unit;

FIG. 14 is a section along the line 14—14 of FIG. 12;

FIG. 15 is a part side view and part section along the line 15—15 of FIG. 16;

FIG. 16 is a transverse section on the center line of the catalyst vapor generator;

FIG. 17 is a front view of the mixing chamber reception unit for the catalyst vapor nitrogen mix produced by the vapor generator;

FIG. 18 is a cross-section along the line 18—18 of FIG. 17;

FIG. 19 is a general view of panels of the control console;

FIG. 20 is a schematic diagram of the heating liquid circuit for the vapor generator;

FIG. 21 is a schematic diagram of the main flow of gas catalyst carrier from source through vapor generator to gas mixing chamber and the secondary flow to the liquid catalyst source.

DESCRIPTION OF THE PREFERRED EMBODIMENTS

Figure 1:
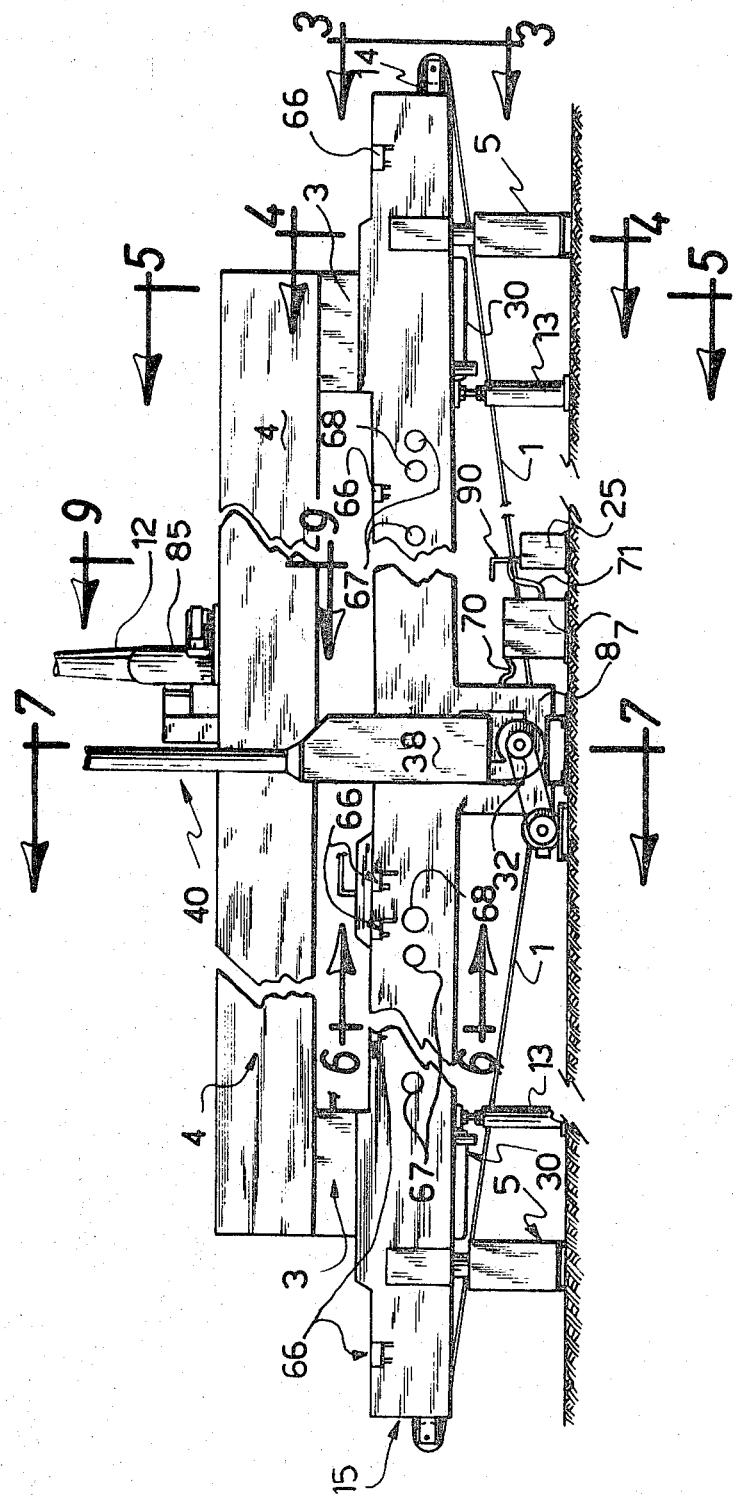
FIG. 1 is a longitudinal front view of an embodiment of the invention.

The machine embodying the invention as illustrated comprises essentially a conveyor 1, curing chamber 2, air curtains 3, common exhaust plenum 4, humid air generators 5, humid air diffusers 6, curing catalyst vapor generator 7, catalyst vapor mixing chamber 8, catalyst supply plenums 38, catalyst manifolds 9, catalyst diffusers 10, liquid heater 11 (FIG. 20), exhaust 12 and supporting legs 13.

A self-contained variable speed mechanical conveyor 1, which in the embodiment of the invention illustrated, is of the continuous rope type, receives the wet coated material at the entrance port 14 and conveys it at predetermined speed through the shallow curing chamber 2 and delivers it at the exit portal 15. As one element in reducing escape or loss of the vaporous catalyst mix, the curing chamber is sloped slightly from each end to the middle and to effect the slight change in the direction of the conveyor ropes, idler pulleys 16 are provided in the upper part of the central mixing chamber 8. To further reduce escape or loss of vaporous catalyst mix, humid air diffusers 6 which are external of the air curtains 3 direct a gentle flow of warm humid air produced in the generators 5 towards the curtains which rises through them and into the common exhaust plenum 4 through a series of five small tubes 19 at the top of each curtain which tend to restrict flow and finally proceeds out of the exhaust 12. The direction of flow of the humid air is against any outflow of the curing vapor through the entry or exit ports which in addition deflects any net flow of curing vapor up through the air curtain. Labyrinths 18 forming part of each air curtain 3 also serve to reduce loss or escape of curing vapor. Pressures in each section of the exhaust plenum 4 are measured by pressure gauges 50 (FIG. 19) connected to each half of the plenum. Any pressure differential between the air curtains 3 is measured by balancing pressure gauge 49. Control units combining the pressure switches 52 (FIG. 19) and temperature gauges 53 (FIG. 19) maintain the temperature and pressure of the humid air supply through control of its heat and water supplies.

Figure 5:
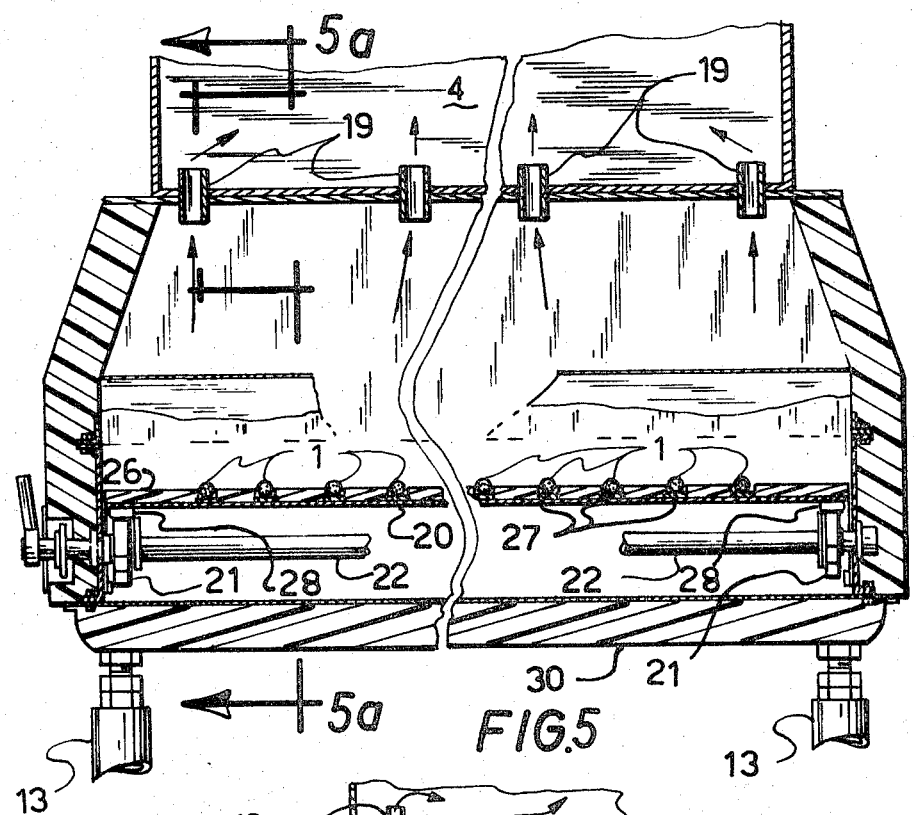
FIG. 5 is a part section on the line 5—5 of FIG. 1.

Adjustment of the apertures at the entry port 14 and exit port 15 to reduce entry of air borne oxygen by maintaining minimum openings when dealing with materials of different thicknesses is effected by movable platforms 20 located below the air curtains and labyrinths in cavities made in the floor of the curing chamber, the platforms being supported by four cams 21 in contact with bearing plates 28 on the under side of each platform. The level of the platforms and consequently the depths of the apertures at the entrances to the actual curing chamber is adjusted by means of the cams 21 which are attached to two hand-operated cam shafts 22 passing through the lateral walls of the chamber. To maintain alignment of the carrier ropes across the top of the platform, guides 26 (FIG. 5) are provided and to prevent wear of the ropes and the top of the platform spring steel bars 27 bowed under slight compression are inserted between the guides. This platform consists of a top and side walls stiffened by a flat wide channel 29 pressed from steel sheeting and running transversely under the floor of the platform. The bottom of the cavity is sealed and insulated by a sheet steel insulation filled base 30 and to prevent any build up of liquid seeping down between the platform and the cavity walls a drain connection 23 is provided to a common sump.

Figure 5A:
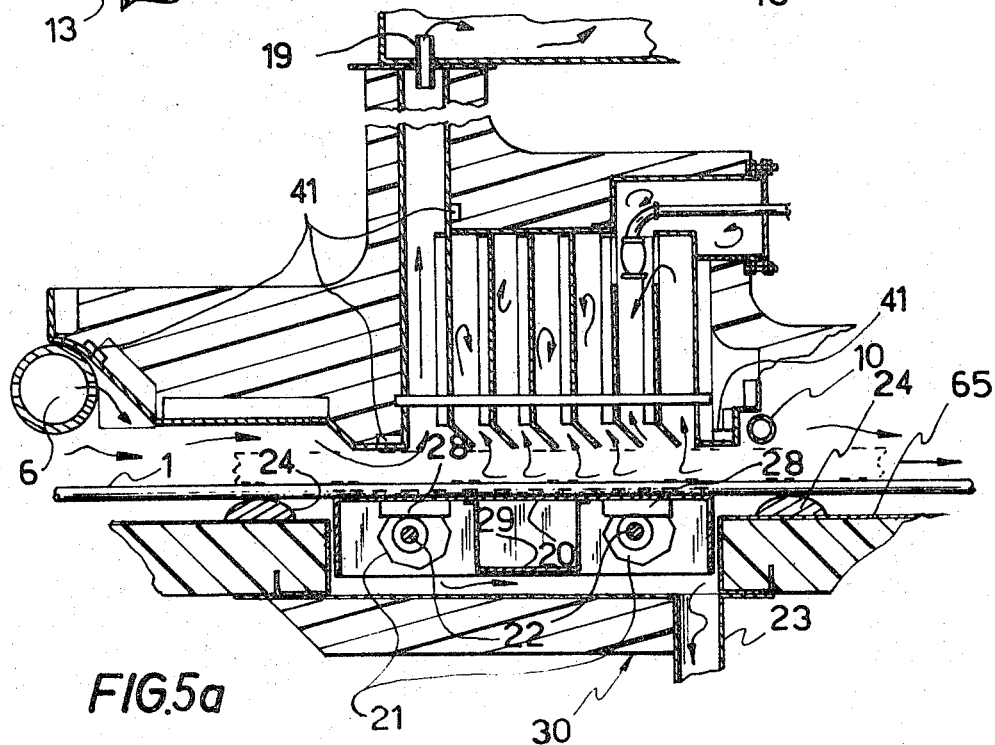
FIG. 5a is a part section on the line 5a—5a of FIG. 5.

To prevent wear of the conveyor ropes and the floor of the curing chamber, wear buttons 24 (FIG. 5a) are fixed to the floor at suitable intervals which support the conveyor ropes 1 above the curing chamber floor 65.

Figure 6:
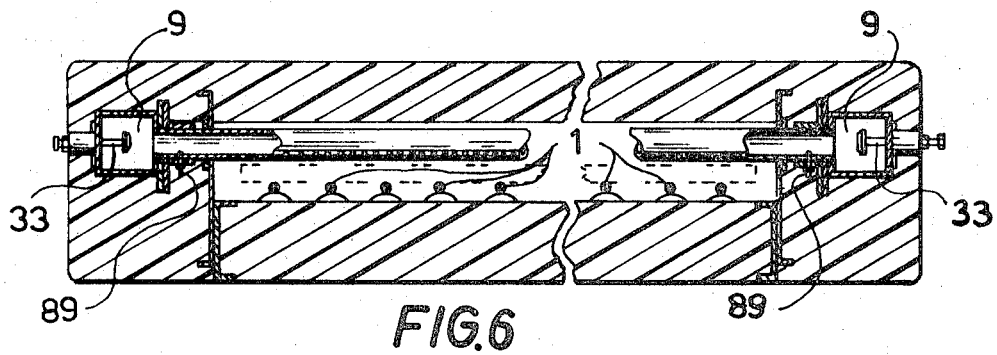
FIG. 6 is a section on the line 6—6 of FIG. 1.
Figure 6A:
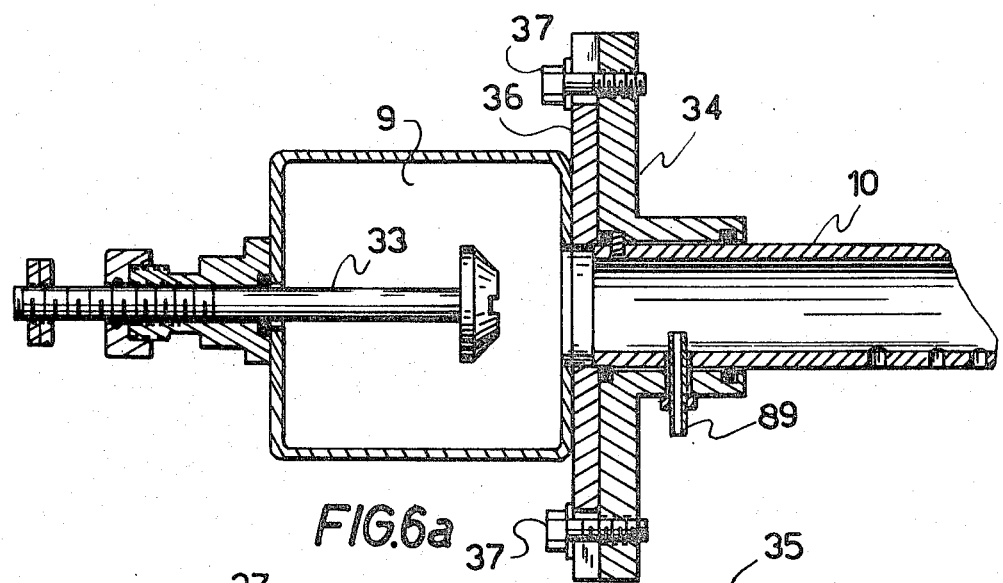
FIG. 6a is an enlarged view of one end of FIG. 6.
Figure 6B:
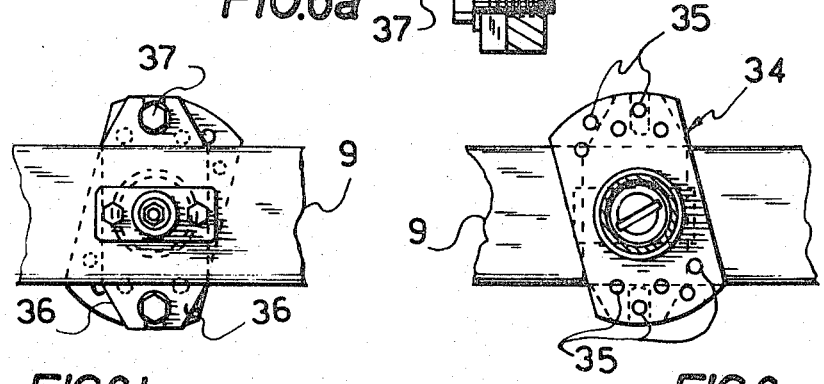
FIG. 6b is a detail of the rotation control member attached to the catalyst vapor impinger or diffuser tubes.
Figure 6C:
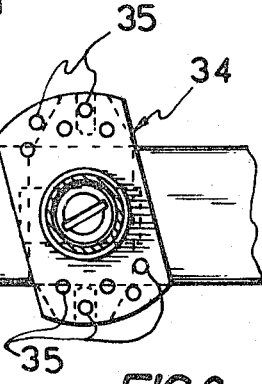
FIG. 6c is a detail of the rotation control member attached to the manifold wall.
Figure 8:
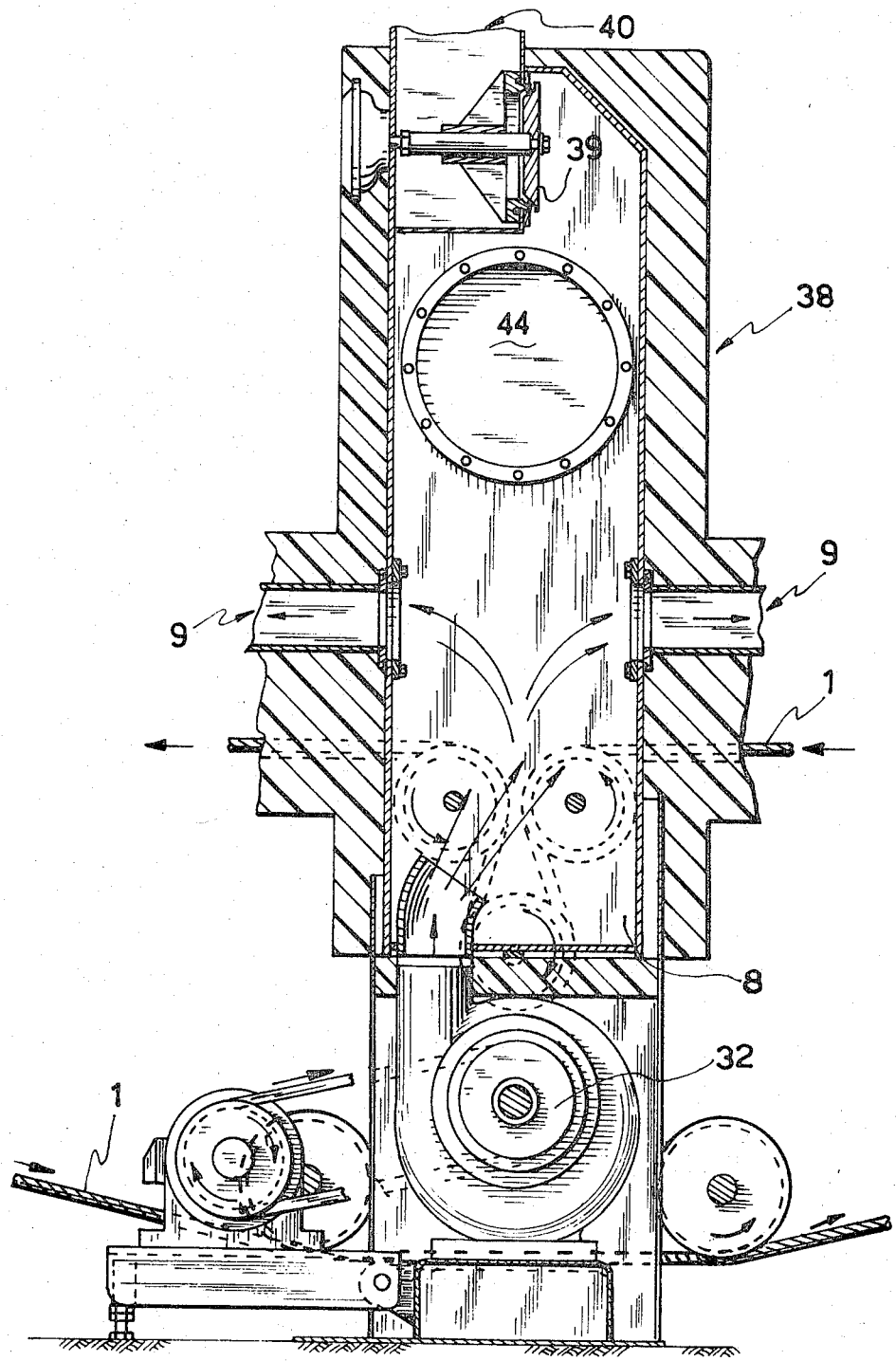
FIG. 8 is a section on the line 8—8 of FIG. 7.
Figure 22:
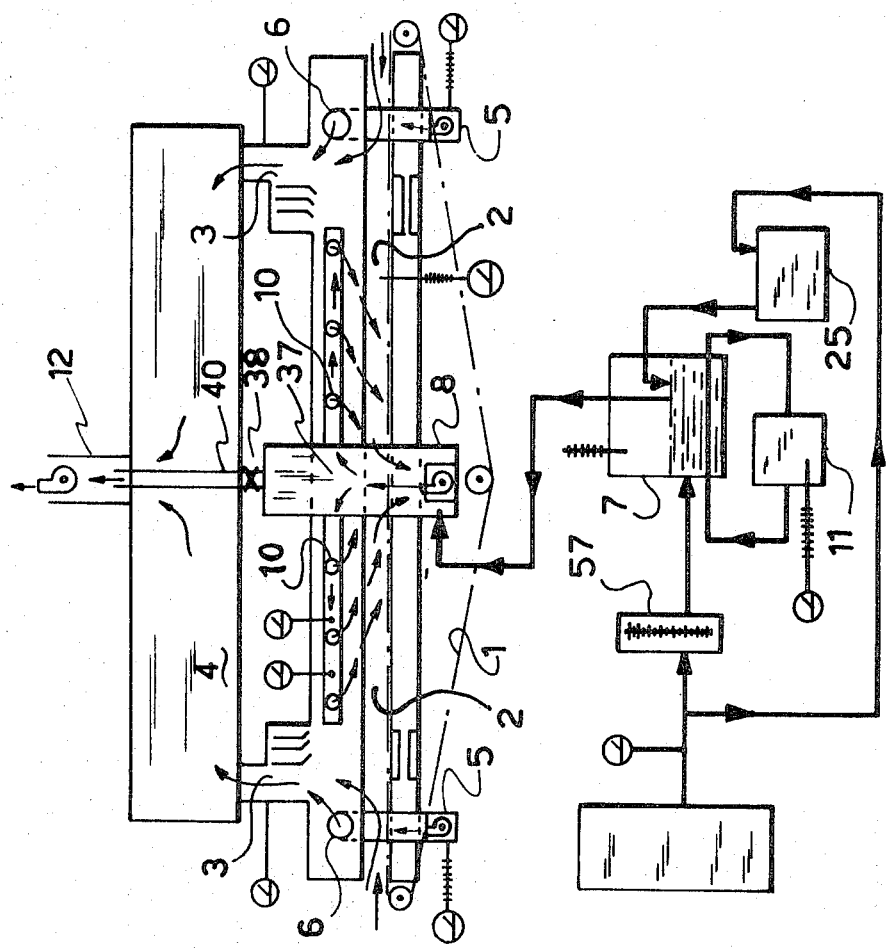
FIG. 22 is a general schematic diagram of the operation of an embodiment of the invention.

Vaporous catalyst mixing fans 32 (FIG. 1) located in supply plenums 38 attached to each end of the mixing chamber take the catalyst from the mixing chamber 8 and direct it into the catalyst manifolds 9 which carry it to the catalyst diffusers 10 located in the roof of the curing chamber which spray it at an angle towards the center of the chamber which provides turbulence to maintain uniformity of the catalyst nitrogen mix and also directs the flow toward the mixing chamber so that the cycle may continue. Any condensed vapor is discharged through the drain 88. Manually controlled-air-operated exhaust or dump valves 39 (FIG. 7) permit discharge of the supply plenums and mixing chambers, if required or desirable for any reason, through the exhaust pipe 40 connected to the general exhaust stack 12. In order to produce the same pressure and rate of flow in all catalyst diffusers 10 irrespective of the distance from the intake ends of the manifold, hand-operated mushroom valves 33 (FIG. 7) are provided at both ends of each diffuser which permit appropriate adjustment to be made to compensate for any differential in manifold pressure due to the distance from the intake ends of the manifold as indicated by pressure gauges 67 and any pressure differential in laterally corresponding diffusers as indicated by pressure gauges 68. Any imbalance between the end pressures in the diffusers 10 is indicated by gauge 55 (FIG. 19) connected to probes 89 (FIG. 6) at each end of the diffusers. To permit adjustment of direction of discharge of catalyst mix to avoid rippling of the wet surface and produce a suitable combination of turbulence and flow, end plates 34 (FIG. 6a) are fixed to each end of the diffusers. A series of threaded holes 35 is provided at the top and bottom of each plate, the circular spacing of these holes permitting a number of changes of the angle of discharge. Corresponding plates 36 with single slots at top and bottom are attached to the manifold. The slots are deep enough to permit studs 37 to be threaded to any pair of holes 35 in the plates 34. Cavities are provided in the side walls of the curing chamber to house the valves 33 and to permit access to the plates 34 and the studs 37.

Figure 2:
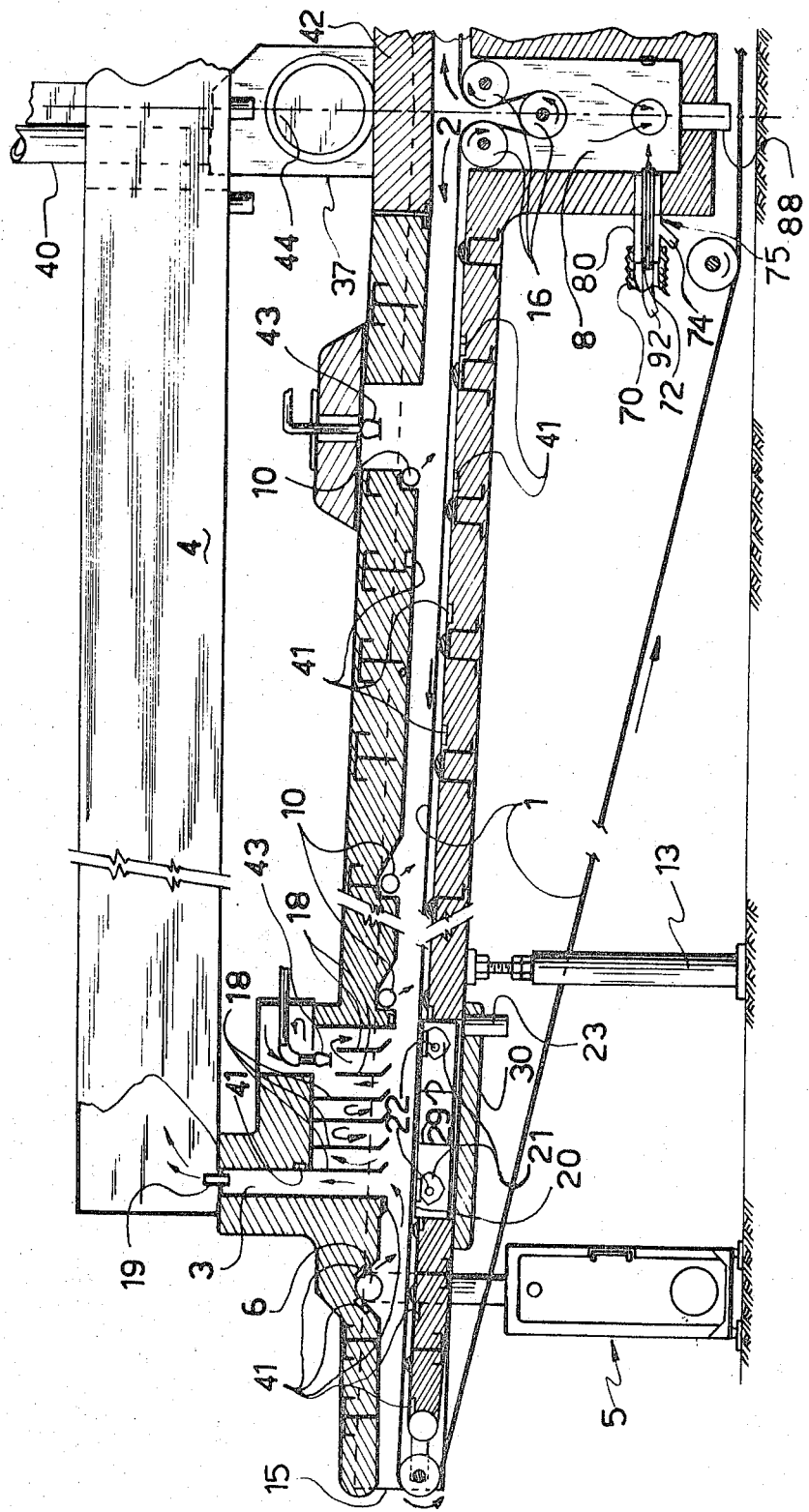
FIG. 2 is a part section along the longitudinal center line of this embodiment.
Figure 3:
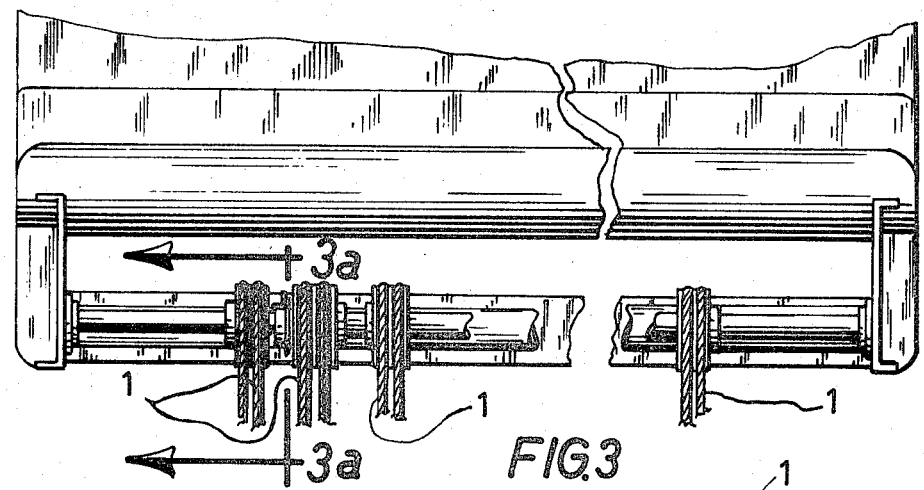
FIG. 3 is an end view of this embodiment.
Figure 3A:
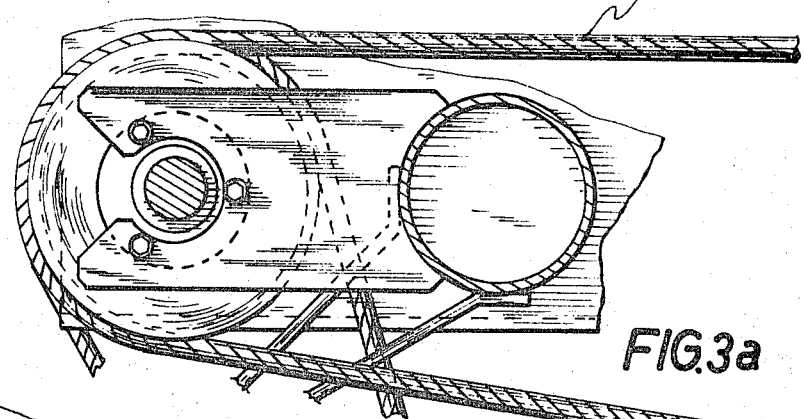
FIG. 3a is an enlarged section on the line 3a—3a of FIG. 3.
Figure 4:
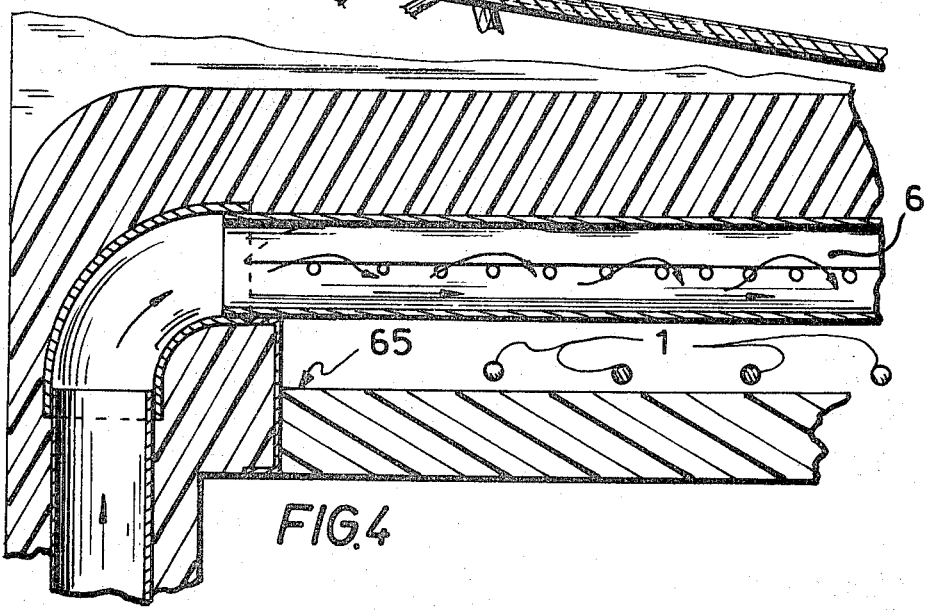
FIG. 4 is a part section on the line 4—4 of FIG. 1.

While the machine may be housed in any area at normal room temperature, a higher temperature may be required in the curing chamber 2 to maintain the vaporized catalyst above the dew point. In order to provide and maintain such appropriate above dew point temperature, heat tapes 41 (FIG. 2), controlled by thermostats 66 (FIG. 1) are provided at suitable intervals in the floor and roof of the curing chamber 2 and in the walls of the air curtains 3. For control and regulating purposes, a recording thermometer 54 is connected to the curing chamber 2 in addition to the thermostats 66. To produce the catalyst vapor at the appropriate temperature in the vapor generator 7, hot liquid is circulated in the walls 73 (FIG. 15) of the generator and in the tubes 51 (FIG. 15 and FIG. 16) connected between the walls in the area filled with liquid catalyst. The hot liquid from the heater 11 (FIG. 20) which enters the outer sleeve 80 (FIG. 2) of the reception fitting 75 in the wall of the mixing chamber 8 by the tube 74 proceeds through the outer sleeve of delivery tube 70 (FIG. 15) to the sleeve 91 of the catalyst vapor nitrogen mix discharge fitting 78 of the vapor generator 7 to the hollow sidewall of the vapor generator from which it passes into and through the tubes 51 to the opposite hollow wall and finally leaves the generator by the discharge tube 79. It then passes through the gear pump 46 (FIG. 20) whence it returns to the heater 11 where it is reheated and the flow continues through the same circuit. Pressure switch engage 58 (FIG. 19) controls the supply of liquid catalyst and the meter 61 controls the temperature of the heating liquid. To avoid air pockets in the heating liquid circuit, the filler cap is located above the heater and above the highest point of the circuit. The circulation of the heating liquid in the heater circuit is provided by the gear pump 46 and expansion or contraction of the liquid due to temperature variation is compensated for the expansion valve 47.

As the concentration or density of the catalyst in the curing chamber must be maintained within predetermined limits, the dilution created by the entry of air through the entry and exit ports of the curing chamber and the loss of catalyst in the chamber through the air curtains must be compensated for by the addition of new nitrogen catalyst vapor mix. The amount of dilution is measured by an oxygen analyzer 48 (FIG. 19) which is connected to a sensor located in the curing chamber 2. The oxygen analyzer is calibrated with reference to the operating density range of the catalyst vapor so that the meter reading on the scale indicates the actual percentage of catalyst vapor in the curing chamber.

Vapor pressure changes within the vapor generator operate pressure switches within the limits set on pressure gauge 58 (FIG. 19). Upon reaching the low limit, solenoid valves 81 and 82 (FIG. 21) will allow nitrogen to be fed through the tube 90 (FIG. 1) into the liquid catalyst container 25 which drives the liquid catalyst into the vapor generator 7 through the supply tube 71 to the receiving fitting 63. Upon reaching the high limit set by prssure gauge 58, the flow of nitrogen into the catalyst container is shut off by the solenoids 81 and 82 (FIG. 21) and the flow of liquid catalyst to the generator 7 ceases. Adjustment of the nitrogen flow rate to the liquid catalyst container 25 is made by needle valve control 59 (FIG. 19). Nitrogen fed directly to the generator 7 through supply tubes 31 (FIG. 15) rises through the hot liquid catalyst and picks up the catalyst vapor. The nitrogen catalyst mix enters the slotted collector pipe 77 at the apex of the generator from which it enters the delivery fitting 76 whence it passes to the mixing chamber 8 through the supply tube 92 and the receiving fitting 72. The rate of the continuous flow of the carrier nitrogen is measured by the flow meter 57 (FIG. 19) and the adjustment of such rate is made by means of a manual control switch 83 (FIG. 19) or otherwise by the automatic control switch 84.

Variations in the density of the catalyst carrier mix, necessitated either by the characteristics of the catalyst used or those of the surface finish to be cured, may be made by varying the rate of catalyst vapor production and the absorption capacity of the carrier, both of which are relative to their respective temperatures. The catalyst vapor thermometer 60 (FIG. 19) is connected to the probe 62 (FIG. 16) in the vapor generator. Appropriate temperature changes are made by varying the temperature of the liquid fed to the vapor generator by adjusting the temperature in the liquid heater. The heating liquid tank temperature control meter 61 is connected to the probe 64 in the vapor generator.

As the vaporized catalyst may form a flammable or explosive mixture in the presence of oxygen, a blowout panel 42 is provided over the mixing chamber and sprinklers 43 are provided in the air curtains and in the roof of the curing chamber and plexi-glass blow-out ports 44 (FIG. 2) are inserted in the interior walls of the supply plenums. In addition, if unacceptable oxygen content or pressure builds up in the curing chamber, a special electrical circuit controlled by switch 69 (FIG. 19) simultaneously shuts off all material and curing vapor supplies to the machine without affecting the operation of the mixing 32 or exhaust 85 fans and activates the valves of the supply plenums so that the entire content of curing vapor in the machine may be exhausted to the open air in a matter of seconds.

To eliminate atmospheric pollution by the escaping catalyst vapor, it is neutralized before it leaves the exhaust stack 12. This is effected by means of injector units 45 (FIG. 14) installed in each half of the exhaust plenum under the exhaust stack by means of which an appropriate neutralizer, depending on whether the catalyst is alkaline or acid in nature, may be introduced into the escaping nitrogen catalyst mix through the delivery tube 86. While a gaseous neutralizer may be used, it has been found that the temperature and continuous flow through the exhaust plenum to the stack is sufficient to vaporize a liquid neutralizer in sufficient volume to effectively neutralize the escaping catalyst. The units also house the probe 87 of the exhaust plenum pressure gauge 50.

Time of exposure of the wet surface to the curing vapor may be varied by appropriate adjustment of conveyor speed.

To minimize heat loss and assist in maintaining the appropriate temperature in the curing chamber and the other areas of the machine in which condensation of the catalyst vapor must be avoided, all side walls, floors and roofs of the curing and mixing chambers, the associated air curtains and the supply plenums are insulated in addition to the area between the entry and exit ports and the air curtains.

To prevent any accumulation of liquid from condensation occurring in the exhaust plenums, the floor of the plenum slopes slightly from each end towards the center and from front to rear with drain pipes leading to a common sump inserted at the low point in the central back area of the plenum floor.

We claim:

1. An apparatus for fast curing wet resin coated articles, comprising a mechanical conveyor for continuously conveying the wet coated articles through a curing chamber, means for producing and passing a vaporous accelerator through the curing chamber in contact with the wet coating of the article during the period of its passage through the curing chamber, means for avoiding the escape of the vaporous accelerator to the atmosphere, means for controlling the temperature and density of the vaporous accelerator within the curing chamber, said means for producing the vaporous catalyst comprising an automatic vapor generator connected to a source of inert carrier gas under low pressure and installed between a supply of liquid catalyst and a mixing chamber incorporated with the curing chamber, the means for conveying or directing the vaporous catalyst-carrier mix to the curing chamber comprising fans located in supply chambers at each end of the mixing chamber, drawing from the mixing chamber and exhausting into supply chambers which are connected to manifolds located in the side walls of curing chamber which are connected to each end of transverse perforated diffuser tubes located above the conveyor which spray the catalyst carrier gas mix throughout the curing chamber and thus into contact with all exposed surfaces of the wet coated material, the means for providing and maintaining the required density of the vaporous catalyst carrier gas mix comprising a control for the heat supply to the vapor generator heating liquid associated with the liquid catalyst feed or supply control, the means for producing and maintaining the required temperature of the catalyst vapor carrier mix in the curing chamber comprising thermostatically controlled heat tapes located in the roof, floor and walls of the curing chamber as well as in the entrance and exit to such chamber, the means for minimizing the loss of catalyst comprising air curtains located between the ends of the curing chamber and the entrance and exit portals for the carrier, and the means for avoiding atmospheric pollution comprising means to release a suitable neutralizing agent into the exhaust plenum.

2. An apparatus as defined in claim 1, in which warm humid air is delivered to the exterior or portal sides of the air curtains.

3. An apparatus as defined in claim 1, in which the diffusers are located in depressions in the roof of the curing chamber.

4. An apparatus as defined in claim 1, in which the perforated catalyst diffuser tubes or pipes may be rotated to adjust the turbulence and flow pattern of the curing vapor mix in the curing chamber and have threaded stem mushroom valves at each end, the valve stems passing through the supply manifolds to permit external adjustment of the flow of catalyst into each pipe to compensate for the pressure differential in the manifolds as the distance increases from the mixing chamber.

5. An apparatus as defined in claim 1, in which vertically adjustable sections or platforms are inserted in each end of the floor of the curing chamber under the conveyor to permit maintaining minimum openings for the reception of materials of different thicknesses.

* * * * *